(12) United States Patent
Garrett

(10) Patent No.: US 9,517,948 B1
(45) Date of Patent: Dec. 13, 2016

(54) PORTABLE PERSONAL WATER FILTRATION SYSTEM

(71) Applicant: Sylvia Marie Garrett, Los Angeles, CA (US)

(72) Inventor: Sylvia Marie Garrett, Los Angeles, CA (US)

(*) Notice: Subject to any disclaimer, the term of this patent is extended or adjusted under 35 U.S.C. 154(b) by 0 days.

(21) Appl. No.: 14/951,477

(22) Filed: Nov. 24, 2015

(51) Int. Cl.
 *C02F 1/00* (2006.01)
 *C02F 1/28* (2006.01)
 *C02F 1/32* (2006.01)

(52) U.S. Cl.
 CPC .............. *C02F 1/002* (2013.01); *C02F 1/283* (2013.01); *C02F 1/325* (2013.01); *C02F 2201/009* (2013.01); *C02F 2201/322* (2013.01)

(58) Field of Classification Search
 None
 See application file for complete search history.

(56) References Cited

U.S. PATENT DOCUMENTS

| | | | | |
|---|---|---|---|---|
| 580,527 A | * | 4/1897 | Martin .................. | C02F 1/002 210/251 |
| 1,000,332 A | * | 8/1911 | Dyer ..................... | C02F 1/002 210/251 |
| 1,001,218 A | * | 8/1911 | Parenteau ............. | C02F 1/002 239/33 |
| 1,333,011 A | * | 3/1920 | Crady ................... | B01D 35/00 210/251 |
| 2,376,231 A | * | 5/1945 | Cohn ..................... | B01L 3/021 222/158 |
| 2,692,503 A | * | 10/1954 | Crecelius .............. | B01L 3/021 422/564 |
| 3,087,560 A | * | 4/1963 | Dodson ................. | E21B 43/086 166/230 |
| 3,389,803 A | * | 6/1968 | Barley .................. | A47G 21/188 210/266 |
| 3,744,639 A | * | 7/1973 | Teeple, Jr. ............. | B01D 23/04 210/265 |
| 4,298,475 A | * | 11/1981 | Gartner ................. | A47G 21/188 210/266 |
| 4,767,544 A | * | 8/1988 | Hamblin ............... | C02F 1/002 210/317 |
| 4,995,976 A | * | 2/1991 | Vermes ................. | C02F 1/002 210/266 |
| 5,045,195 A | * | 9/1991 | Spangrud .............. | C02F 1/002 210/266 |

(Continued)

*Primary Examiner* — Robert Popovics
(74) *Attorney, Agent, or Firm* — Plager Schack LLP

(57) ABSTRACT

Some embodiments of the present disclosure include a portable liquid filtration system for providing a user with filtered liquid from a non-filtered source. The system may include a drinking conduit extending from a housing, the housing having a liquid entrance port at an end of the housing distal from the drinking conduit, and at least one organic filter and at least one chemical filter positioned within the housing. The filters may include charcoal containers, iodine-treated sieves, carbon filters, an untreated sieve, and a hexafluoro alcohol treated sieve. When non-filtered liquid is drawn into the liquid entrance port, through the housing, and to the drinking conduit, the liquid may pass through all of the filters, resulting in the liquid being filtered when it reaches the drinking conduit. The system may also include at least one solar panel attached to a UV light positioned within the liquid entrance port.

2 Claims, 2 Drawing Sheets

(56) References Cited

U.S. PATENT DOCUMENTS

| | | | | |
|---|---|---|---|---|
| 5,156,335 A | * | 10/1992 | Smith | A47G 21/188 210/266 |
| 5,156,737 A | * | 10/1992 | Iana | C02F 1/002 210/266 |
| 5,273,649 A | * | 12/1993 | Magnusson | C02F 1/002 210/232 |
| 5,362,385 A | * | 11/1994 | Klegerman | C02F 1/002 210/136 |
| 5,509,605 A | * | 4/1996 | Cripe | C02F 1/002 210/266 |
| 5,518,613 A | * | 5/1996 | Koczur | C02F 1/002 210/266 |
| 5,545,315 A | * | 8/1996 | Lonneman | C02F 1/003 210/120 |
| 5,718,681 A | * | 2/1998 | Manning | A61J 7/0038 239/33 |
| 6,136,188 A | * | 10/2000 | Rajan | B01D 35/027 210/244 |
| 6,142,384 A | * | 11/2000 | Shafik | C02F 1/002 210/282 |
| D438,591 S | * | 3/2001 | Froeber | D23/207 |
| 6,224,764 B1 | * | 5/2001 | Matyushin | A61L 2/022 210/266 |
| 6,395,170 B1 | * | 5/2002 | Hughes | B01D 35/02 210/232 |
| 6,811,036 B1 | * | 11/2004 | Vaiano | A47G 21/188 210/459 |
| 7,473,362 B1 | * | 1/2009 | Nohren, Jr. | B01D 61/18 210/321.64 |
| 7,584,900 B2 | * | 9/2009 | White | A23G 3/50 215/388 |
| 7,837,865 B2 | * | 11/2010 | Wadstrom | A61L 2/26 210/192 |
| 8,128,820 B2 | * | 3/2012 | Wu | C02F 1/003 210/232 |
| 8,177,966 B2 | * | 5/2012 | Wu | C02F 1/003 210/232 |
| 8,192,699 B2 | * | 6/2012 | Ziegmann | B01L 3/0275 422/524 |
| 8,216,462 B2 | * | 7/2012 | O'Brien | C02F 1/002 210/106 |
| 8,828,222 B2 | * | 9/2014 | Maiden | A45F 3/20 210/192 |
| 8,852,439 B2 | * | 10/2014 | Frauchiger | A47G 21/188 210/257.2 |
| 9,005,684 B2 | * | 4/2015 | Baron | A47G 21/183 239/33 |
| 9,067,804 B2 | * | 6/2015 | Jones | C02F 1/002 |
| 9,138,741 B2 | * | 9/2015 | Ziegmann | B01L 3/0275 |
| 9,302,919 B2 | * | 4/2016 | Cheng | C02F 1/002 |
| 2002/0088745 A1 | * | 7/2002 | Barlow | C02F 1/002 210/266 |
| 2003/0164333 A1 | * | 9/2003 | Nohren, Jr. | A45D 33/008 210/650 |
| 2006/0157398 A1 | * | 7/2006 | Nohren | B01D 61/18 210/266 |
| 2006/0175248 A1 | * | 8/2006 | Raimondo | A47G 21/188 210/497.01 |
| 2009/0041904 A1 | * | 2/2009 | Baron | A47G 21/183 426/85 |
| 2010/0032353 A1 | * | 2/2010 | Frandsen | C02F 1/003 210/86 |
| 2010/0032358 A1 | * | 2/2010 | Vestergaard Frandsen | A47G 21/188 210/202 |
| 2010/0032381 A1 | * | 2/2010 | O'Brien | C02F 1/002 210/749 |
| 2010/0102002 A1 | * | 4/2010 | O'Brien | C02F 1/002 210/668 |
| 2011/0284479 A1 | * | 11/2011 | O'Brien | C02F 1/002 210/764 |
| 2012/0228400 A1 | * | 9/2012 | Baron | A47G 21/183 239/33 |
| 2012/0298583 A1 | * | 11/2012 | Frauchiger | A47G 21/188 210/650 |
| 2014/0197084 A1 | * | 7/2014 | Cheng | C02F 1/002 210/110 |
| 2015/0374169 A1 | * | 12/2015 | Salas-de la Cruz | A47J 31/605 99/290 |

* cited by examiner

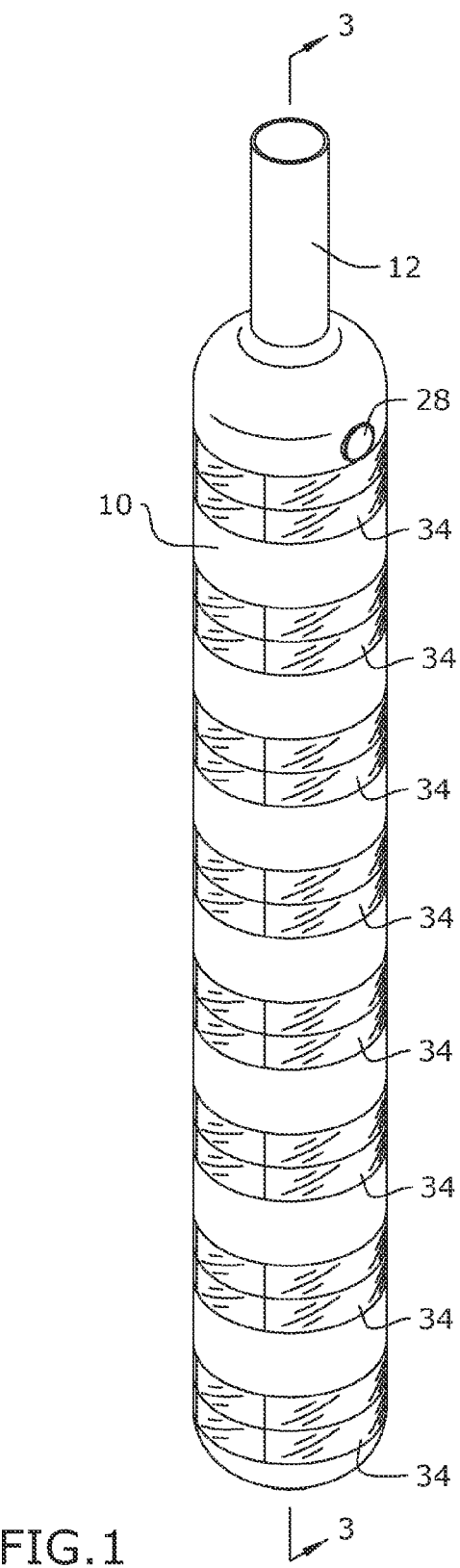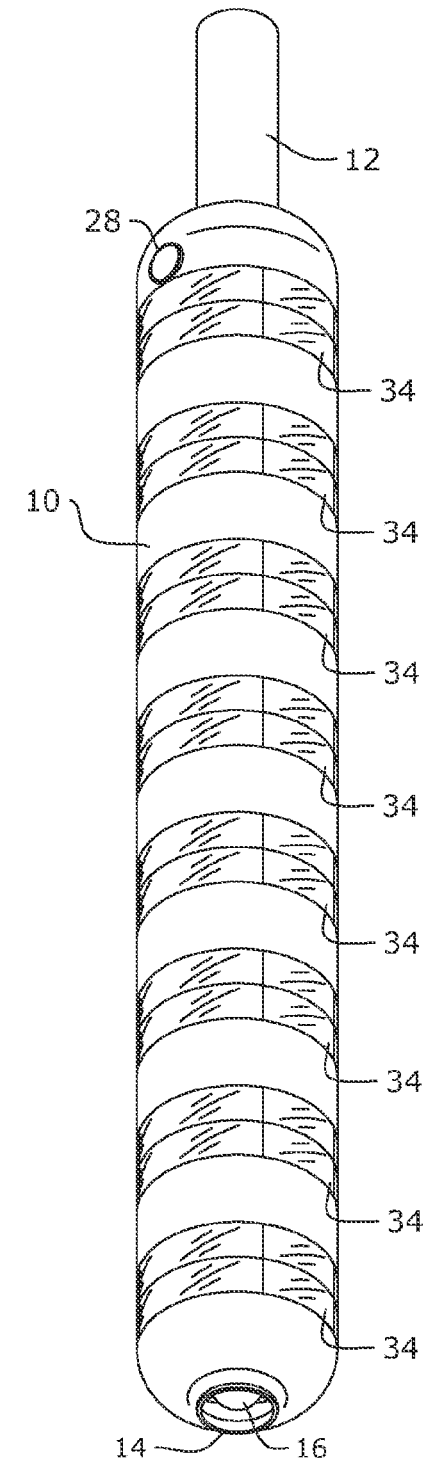
FIG.1
FIG.2

PORTABLE PERSONAL WATER FILTRATION SYSTEM

BACKGROUND

The embodiments herein relate generally to water filtration, and more particularly, to a portable, personal water filtration system.

Conventional water filtration systems contain either organic or chemical filters, but not both. As a result, the conventional water filtration systems are incomplete and do not simultaneously filter out contaminants, such as particulates, pesticides, toxins, insecticides, and herbicides, and organisms, such as disease causing microorganisms, pathogens, larva, eggs, and the like. Many existing water filtration systems are not easily portable and also require an external energy source to function.

Therefore, what is needed is a portable, personal water filtration system that can simultaneously filter out contaminants and organisms, providing a more complete and effective filtering system.

SUMMARY

Some embodiments of the present disclosure include a portable liquid filtration system for providing a user with filtered liquid from a non-filtered source. The system may include a drinking conduit extending from a housing, the housing having a liquid entrance port at an end of the housing distal from the drinking conduit, and at least one organic filter and at least one chemical filter positioned within the housing. The filters may include charcoal containers, iodine-treated sieves, carbon filters, an untreated sieve, and a hexafluoro alcohol treated sieve. When non-filtered liquid is drawn into the liquid entrance port, through the housing, and to the drinking conduit, the liquid may pass through all of the filters, resulting in the liquid being filtered when it reaches the drinking conduit. The system may also include at least one solar panel attached to a UV light positioned within the liquid entrance port.

BRIEF DESCRIPTION OF THE FIGURES

The detailed description of some embodiments of the invention is made below with reference to the accompanying figures, wherein like numerals represent corresponding parts of the figures.

FIG. 1 is a top perspective view of one embodiment of the present disclosure.

FIG. 2 is a bottom perspective view of one embodiment of the present disclosure.

DETAILED DESCRIPTION OF CERTAIN EMBODIMENTS

Figure 3:
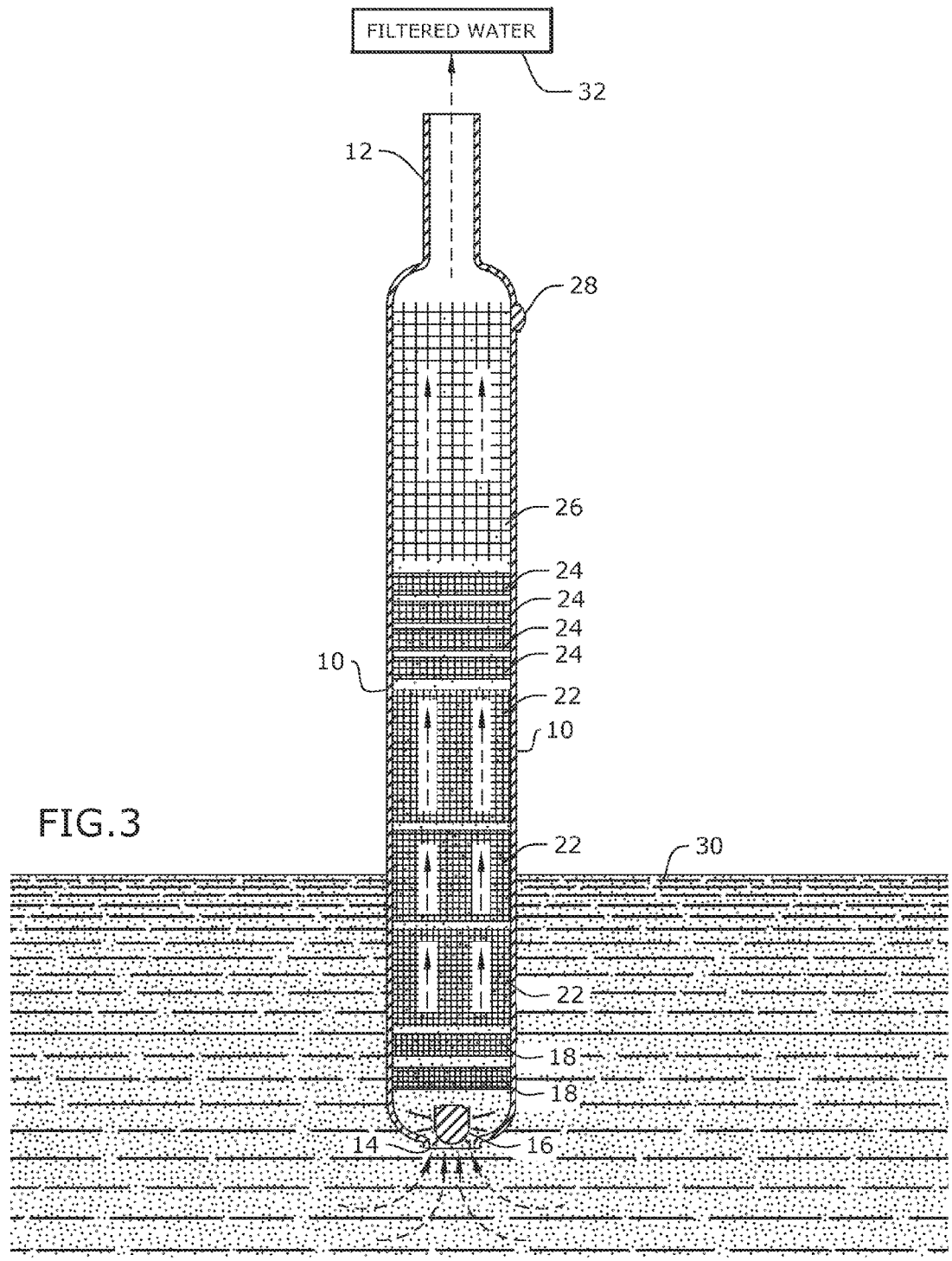
FIG. 3 is a section view of one embodiment of the present disclosure, taken along line 3-3 in FIG. 1.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used filter contaminated water, providing potable water to individuals with limited access to clean water sources and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Housing
2. Drinking Conduit
3. Organic Filters
4. Chemical Filters
5. Solar Panels The various elements of the portable, personal water filtration for filtering a liquid, such as water, of the present disclosure may be related in the following exemplary fashion. It is not intended to limit the scope or nature of the relationships between the various elements and the following examples are presented as illustrative examples only.

By way of example, and referring to FIGS. 1-3, some embodiments of the portable water filtration system of the present disclosure comprise a drinking conduit 12 extending from a substantially hollow housing 10, the housing 10 comprising a liquid entrance port 14 at an end of the housing 10 distal from the drinking conduit 12 and at least one organic filter and at least one chemical filter positioned within the housing 10, such that when liquid is drawn into the liquid entrance port 14, through the housing 10, and to the drinking conduit 12, the liquid passes through the at least one organic filter and the at least one chemical filter. For example, non-filtered liquid 30 may flow into the system through the liquid entrance port 14 and filtered liquid 32 may exit the system through the drinking conduit 12.

As shown in FIG. 3, embodiments of the system may comprise multiple organic filters and multiple chemical filters. For example, the system may comprise in order from the liquid entrance port 14 to the drinking conduit 12, at least one charcoal container 18, such as a pair of charcoal containers 18, at least one iodine-treated sieve 22, such as about 2 to about 4 iodine-treated sieves 22, at least one carbon filter 24, such as from about 2 to about 4 carbon filters 24, and at least one untreated sieve 26. In some embodiments, the system of the present disclosure may further comprise a hexafluoro alcohol treated sieve positioned within the housing 10. For example, the hexafluoro alcohol treated sieve may be positioned between the charcoal container 18 and the iodine-treated sieve 22. The different filters and sieves may function to filter out contaminants and organisms to provide an end user with a filtered liquid 32.

As shown in FIGS. 1 and 2, an exterior surface of the housing 10 may comprise at least one solar panel 34 adhered thereto or otherwise built into the exterior surface. For example, in some embodiments, the housing 10 may comprise from about 1 to about 10 solar panels 34, such as from about 6 to about 8 solar panels 34. The solar panels 34 may function as conventional solar panels, storing energy from a light source. The solar panels 34 may be operatively attached to a light, such as an ultraviolet light 16, which may be positioned proximate to the liquid entrance port 14. In some embodiments, the ultraviolet light 16 may also be operatively attached to a button 28 positioned proximate to the drinking conduit 12, such that when a user presses the button 28, the ultraviolet light 16 is illuminated. Because of the solar panels 34, the system of the present disclosure may require no external energy or power source.

The system of the present disclosure may be made of any desired materials and have any desired shape and size. For example, the housing 10 may comprise a plastic housing, such as a BPA-free plastic housing. The sieves 22, 26 may comprise extra fine sieves. The sieves 22, 26 may, for example, comprise a mesh screen having pores with a size small enough to prevent particular organisms or contaminants from passing therethrough. The housing 10 may also be substantially cylindrical in shape. However, other shapes are envisioned.

To use the system of the present disclosure, a user may place the liquid entrance port 14 into a non-filtered liquid 30. The user may then suck on the drinking conduit 12 in a manner similar to drinking through a straw to pull the liquid through the housing 10. As the liquid passes through the different filters and sieves, it may become more and more filtered. Filtered liquid 32 may exit the drinking conduit 12 and pass into the mouth of the user, resulting in the user obtaining filtered drinking water from a non-filtered source. When desired, the user may also illuminate the ultraviolet light 16, which may also help with filtering.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method of filtering water comprising the steps of:
   providing a portable water filtration system for filtering a non-filtered water source, the portable water filtration system including:

a drinking conduit extending from one end of an elongated, substantially cylindrical, hollow housing including at least one solar panel, and a liquid inlet port at a distal end of said housing;

at least one carbon filter positioned within said housing;

at least one iodine treated sieve positioned within said housing;

at least one hexafluoro alcohol treated sieve positioned within said housing;

an ultraviolet light positioned proximate to said liquid inlet port and operatively connected to said at least one solar panel; and a button operatively connected to said ultraviolet light, and positioned proximate to said drinking conduit, said button being operable to illuminate said ultraviolet light when pressed;

immersing said distal end inlet into a body of water; and drawing water through said inlet of said portable water filtration system by placing the user's mouth about said drinking conduit and sucking, wherein non-filtered water is drawn into the liquid inlet port, through said housing, and to said drinking conduit, the non-filtered water passing through said filter/sieves, resulting in filtered water when it reaches the drinking conduit.

2. A method of filtering water as set forth in claim 1 further comprising the step of:
   pressing said button, thereby illuminating said ultraviolet light.

\* \* \* \* \*